United States Patent [19]
van de Leemput et al.

[11] 4,450,098
[45] May 22, 1984

[54] PROCESS FOR PREPARING A POLYMERIZATION CATALYST AND PREPARATION OF ETHYLENE POLYMERS WITH THIS CATALYST

[75] Inventors: Lambertus J. M. A. van de Leemput, Echt; Godefridus A. H. Nooijen, Helden-Panningen, both of Netherlands

[73] Assignee: Stamicarbon B.V., Geleen, Netherlands

[21] Appl. No.: 405,372

[22] Filed: Aug. 5, 1982

[30] Foreign Application Priority Data

Aug. 6, 1981 [NL] Netherlands ............................ 8103700

[51] Int. Cl.³ ............................................... C08F 4/62
[52] U.S. Cl. ................................... 502/107; 502/111; 502/117; 526/142; 526/169
[58] Field of Search ............... 252/429 B, 429 C, 430, 252/431 R, 431 C

[56] References Cited

U.S. PATENT DOCUMENTS 3,708,465  1/1973  Dietrich et al. .................. 260/93.7
4,146,695  3/1979  van de Leemput ............ 252/430 X
4,209,603  6/1980  van de Leemput ............ 252/430 X

OTHER PUBLICATIONS

R. A. V. Faff and R. W. Doak: "High Polymers", vol. XX, 1965, part I, Crystalline Olefin Polymers, John Wiley and Sons, Inc. London (GB); p. 371, lin s7–16.

Primary Examiner—Patrick Garvin

[57] ABSTRACT

Process for preparing and treating a chromium-containing catalyst so that when the catalyst is activated the risk of explosion is substantially reduced. The catalyst comprises a complex of chromium and optionally other transition metal complexes reacted with one or more organometallic compounds of a metal of group II or III of the periodic table, which metal contains hydrocarbyl groups of 1–20 carbon atoms. The reaction product is applied to an inert inorganic support to form the catalyst component which is deactivated by treatment with oxygen or an alcohol to modify or replace residual hydrocarbyl groups. The catalyst component may be activated to form the catalyst by heating in the range 200°–1200° C. The catalyst is used to catalyze a polymerization of alpha-olefins.

7 Claims, No Drawings

PROCESS FOR PREPARING A POLYMERIZATION CATALYST AND PREPARATION OF ETHYLENE POLYMERS WITH THIS CATALYST

BACKGROUND OF THE INVENTION

This invention relates to a process for preparing a chromium-containing catalyst for the polymerization of olefins by applying to an inert inorganic support a complex of a chromium compound with one or more organometallic compounds of a metal of group II or III of the periodic system in which hydrocarbyl groups having 1-20 carbon atoms are bonded to this metal. The support plus chromium complex will be referred to as a "catalyst component". The active catalyst is obtained by heating the catalyst component.

The invention also relates to the polymerization with such a catalyst of an alpha-olefin having 2-8 carbon atoms, in particular ethylene, optionally together with amounts not exceeding 15 mole % of one or more other alpha-olefins having 2-15 carbon atoms.

Similar processes are known from U.S. Pat. No. 4,146,695, or are described in the copending application Ser. No. 261,738, now U.S. Pat. No. 4,382,020, and Ser. No. 320,563. The general method for forming supported chromium catalysts, by way of background, will now be summarized in the following materials.

The chromium (III) compound is complexed with organometallic compounds of a metal from group II or III of the periodic table, such as beryllium, magnesium, boron, aluminium or gallium. These group II or III compounds contain hydrocarbyl groups which are, preferably, alkyl groups having 1-20 carbon atoms.

Suitable organometallic compounds are in particular the aluminum trialkyls and the magnesium dialkyls.

The alkyl groups in the magnesium dialkyls may contain 2 to 12 carbon atoms, preferably 4 to 8 carbon atoms. Suitable organomagnesium compounds are dialiphatics such as diethyl, ethylbutyl, dipropyl, di-isopropyl, dibutyl, di-isobutyl, diamyl, dihexyl, dioctyl, didecyl, and didodecyl magnesium, and also dicycloalkyl magnesium compounds with identical or different cycloalkyl groups having 3-12 carbon atoms, preferably 5 or 6 carbon atoms. Also, the dialkyl magnesium may contain a mixture of an alkyl and a cycloalkyl group. Although alkyl or cycloalkyl magnesium compounds are preferred, magnesium aryls may also be used, particularly diphenyl magnesium, but also ditolyl and dixylyl magnesium. The diaryl magnesium compounds are insoluble or poorly souble in aliphatic hydrocarbons and, for that reason, are dissolved in aromatic hydrocarbons. The organomagnesium compounds may be prepared in a known manner (see e.g. Organometallic Compounds; Vol. 1; G.E. Coates; M. L. H. Green and K. Wade; Organo-metallverbindungen; F. Runge). In particular, use may be made of solutions of magnesium alkyls prepared according to the process described in Dutch Patent Specification No. 139,981.

Suitable aluminum compounds are aluminum trialkyls and organoaluminum compounds having the general formula $(R_4)_2AlH$, where $R_4$ denotes an alkyl group having 1-10 carbon atoms. Aluminum compounds containing one or more groups derived from a diene, as known from, for instance, GB No. 1.332.493 and U.S. Pat. Nos. 3,149,136 and 3,180,837, , may also be employed.

The reaction of the chromium compound with an organomagnesium or organoaluminum compound or another metal from group II or III is carried out in an inert solvent. This inert solvent is preferably a hydrocarbon, particularly one or a mixture of the linear or branched aliphatic hydrocarbons, such as butane, pentane, hexane, heptane, octane, decane, or the branched isomers of these, or a low-boiling gasoline consisting mainly of hexanes and/or heptanes, or a higher-boiling gasoline. Additionally, higher linear or branched saturated aliphatic hydrocarbons or mixtures thereof can also be used as the solvent. Although the chromium (III) compounds dissolve more readily in aromatic hydrocarbon solvents than in aliphatic hydrocarbons and can be reacted therein with magnesium diaryls which are also soluble therein, it is generally desirable not to use aromatic hydrocarbon solvents if adequate yields from the reaction in aliphatic and/or cycloaliphatic solvents are available, particularly in view of the high cost of aromatic hydrocarbon solvents, and also because of possible dangers to health occasioned by aromatic solvents.

Most chromium compounds will be dispersed in the solvent because of their low solubility in aliphatic and/or cycloaliphatic hydrocarbons. Dissolution may be promoted by gentle heating, e.g. at temperatures of 40°-100° C. or, if Low-boiling solvents are used, at the boiling point of the solvent (whether or not under pressure). Because of their low solubility, the chromium compounds will only slightly color the hydrocarbon solvent. However, addition of the organomagnesium or organoaluminum compound will yield dark-colored solutions as it reacts with the chromium compound and the colored product goes into solution.

Very suitable chromium compounds are complexes of chromium with 1,3-diketo compounds such as chromium (III) acetyl acetonate, chromium salts of mineral acids, and chromium salts of saturated or unsaturated aliphatic carboxylic acids.

In addition to the chromium complex, compounds or complexes of one or more other transition metals can also be deposited on the support. The mole ratio of the chromium to the other transition metals can vary within wide limits. In general, the composition of transition metals used should be such that the atomic ratio of chromium to the total other transition metals is between 50:1 and 1:50, preferably between 20:1 and 1:20, and particularly between 10:1 and 1:10. Polymer properties are influenced both by the choice of other transition metals and by the chromium/other transition metal mole ratio.

The ratio of the chromium compounds plus any other transition metal compounds, to the Group II or III organometallic compounds, expressed as the total atomic ratio of the transition metals to the metal of group II or III, is chosen between 1:0.5 and 1:20, preferably between 1:1 and 1:6.

The solution of organochromium complex and other transition metal complex of Group II or III organaometallic compound is combined with an inert inorganic particulate support to form the catalyst component by slowly, and with stirring, adding the solution containing the complexes to the support suspended in the solvent. The complexes can be deposited on the support by evaporation of the solvent if the complexes do not completely adsorb directly from solution. It is easily determined whether the complexes have adsorbed onto the support by simply noting whether the solvent has lightened as the support has become colored.

The inert inorganic support may be an oxide, such as silica, alumina, mixed alumina-silica, or oxides of zirconium, thorium or magnesium. Preferred among these are silica, alumina and alumina-silica mixtures, with silica being preferred in particular. Silica is known as an adsorbent and can be used in many different forms. Particularly suitable are silica xerogels of large pore volume. If desired, the silica can include other components, such as fluorine and titanium, in any known manner. Alternatively, these compounds can also be added after the catalyst component has been formed, either during or following activation.

The support is dried, insofar as necessary, by heating in dry air or nitrogen before the transition metal compounds are deposited. Drying should be such that the support is free of physically bound water.

The amount of complex chromium compounds deposited on the support may vary within wide limits but will generally be in the range of 0.01-10% by wt. of the support as chromium. As discussed previously, compounds of other transition metals can also be deposited on the support, in the ratios to chromium mentioned above.

The catalyst components prepared as described above have been found to contain highly reactive hydrocarbyl groups which are liberated by heating during activation. This decomposition presents difficulties for recovering the catalyst component, because during the recovery procedure the contact with air causes a spontaneous rise in temperature of the catalyst due to the uncontrolled reaction of the hydrocarbyl groups with oxygen. Moreover, these reactive hydrocarbyl groups pose a potential danger when the catalyst component is activated, because during the activation procedure the catalyst component is heated in a non-reducing atmosphere at a temperature of 200°-1200° C. During the activation, the alkyl groups are split off at relatively low temperatures, forming alkenes and alkanes. This decomposition is a rapid process, so that the activation chamber which contains fluidization gas comes to contain considerable amounts of these hydrocarbons. The flash point can easily be approached or even exceeded, and ignition by a spark or an electrostatic charge can lead to an explosion.

SUMMARY OF THE INVENTION

It has now been found, however, that it is possible to prepare a chromium-containing catalyst for the polymerization of olefins with avoidance of the drawbacks mentioned above, by applying to an inert inorganic particulate support, in particular silica, a complex or complexes of a chromium compound, optionally with other transition-metal compounds, with one or more organometallic compounds of a metal of group II or III of the periodic system, in which hydrocarbyl groups having 1-20 carbon atoms are bonded to this metal, followed by subjecting the support with the complex(es) deposited on it to a treatment by which the residual hydrocarbyl groups of the complex(es) deposited on the support are deactivated.

More particularly there is disclosed a process for preparing a chromium-containing catalyst component, which, upon activation with heat at a temperature of from 200° to 1200° C., will effect the polymerization of alpha-olefins, which process comprises:

a. applying to an inert inorganic particulate support the reaction product of
(1) a chromium compound, and
(2) optionally, other transition metal compounds, with
(3) one or more group II or III element hydrocarbyl compounds, wherein the hydrocarbyl groups contain 1-20 carbon atoms; and b. thereafter treating the product of step (a) with molecular oxygen, or organic compound containing at least a hydroxygroup reactive with the hydrocarbyl-groups of said product to decompose the reactive hydro-carbylgroups thereon.

DETAILED DESCRIPTION

The deactivation of the residual hydrocarbyl groups of the complex deposited on the support can be accomplished by several methods. The catalyst component can, for instance, be slowly reacted with oxygen, which method represents an embodiment of the invention. In this procedure, the catalyst component is separated from the reaction mixture which is under an inert atmosphere, and dried under a stream of inert gas in order to expel solvent residues. The catalyst component is then contacted in a controlled manner with an oxygen-containing atmosphere. This can be done very suitable by introducing into the reaction vessel containing the catalyst component an air-stream having a controlled rate of flow, and optionally cooling the vessel in such a way that the temperature never exceeds 100° C.

A second, embodiment of the invention comprises deactivating the hydrocarbyl groups with an alcohol, preferably an alcohol having 1-3 carbon atoms. In this method, the amount of alcohol required for the deactivation can be added directly to the liquid reaction mixture as soon as the chromium and other transition metal complexes have been deposited onto the support. In this manner the heat released during the reaction is easily absorbed by the reaction solvent medium. The deactivation of the hydrocarbyl groups by an alcohol is a fairly rapid process, reaction times ranging from less than half an hour to a few hours usually being adequate.

A third embodiment of the invention comprises the reaction of the hydrocarbylgroups with other organic compounds having a hydroxygroup, as e.g. a carboxylic acid. In this method, the amount of carboxylic acid can be added directly to the reaction mixture as soon as the chromium and other transition metal complexes have been deposites onto the support. Any other oxygen containing organic compound that can decompose the hydrocarbyl groups in the catalyst component can be used. Care must be taken that not some other reaction as e.g. an addition reaction takes place in stead of the decomposition as disclosed more in detail hereinafter. Ethers, aldehydes, and ketones may easily form addition compounds with the catalyst component. Generally compounds having an alkoxy-group and an ether, aldehyde or ketonic configuration are suitable as the conversion of the alkylgroups through the hydroxylgroups into alkoxygroups predominates the addition reaction of other groups. Any person having only ordinary skill in the art can easily determine whether an organic compound is suitable or not. Anyhow this third embodiment is less preferred that the second one, which is the most preferred one.

In the case of deactivation with oxygen, the deactivated hydrocarbyl group remains bonded to the catalyst component, apparently through an oxygen atom, according to the following, schematic reaction/equation:

$$Kat.-R + \tfrac{1}{2}O_2 \rightarrow Kat.-O-R,$$

where R denotes a hydrocarbyl group and Kat. represents the catalyst moiety to which it is attached.

In the case of deactivation with alcohol, the hydrocarbyl group of the catalyst component is replaced by the alkoxy group of the alcohol, according to the schematic reaction/equation:

$$Kat.R + Alkyl-OH \rightarrow Kat.-O-Alkyl + RH,$$

where R and Kat. are as defined above. In this case larger hydrocarbyl groups, particularly the very widely used isobutyl groups, can very suitably be replaced by lower alkoxy groups.

According to the preferred embodiment of the invention, deactivation is effected with methanol so that the hydrocarbyl groups are replaced by the smallest possible alkoxy group. This is particularly advantageous if the catalyst component is activated by being heated at 200°-1200° C. in a non-reducing atmosphere, because then the amount of organic material released during heating is limited to a considerable extent. This limiting is important not only in view of the danger of explosion, but also with regard to the quality of the catalyst obtained.

According to yet another embodiment of the invention, the hydrocarbyl groups can also be deactivated with water. In this procedure, the hydrocarbyl groups are completely expelled, the reaction being schematized as follows:

$$Kat.-R + H_2O \rightarrow Kat.-OH + RH,$$

where R denotes a hydrocarbyl group. In some applications, however, the water has proved to have an adverse effect on the structure of the support material. Therefore deactivation of the hydrocarbyl groups of the complex deposited on the catalyst support is preferably effected with oxygen or with alcohol, as explained above, and most preferably with methanol.

After the conversion of the hydrocarbyl groups the catalyst component is heated in a non-reducing atmosphere, such as oxygen, air, nitrogen, carbon dioxide or a noble gas, at a temperature of 200°-1200° C. Preferably, the atmosphere in which heating takes place is an oxidizing one, such as, for instance, oxygen, oxygen-containing noble gases or air. Obviously, air with a reduced or increased oxygen content also provides an oxidizing atmosphere and can be used as such. The heat treatment of the catalyst component is necessary to activate it to a useful catalyst.

Kat.-O-alkyl bonds as formed by the present deactivating process are much more stable to the heat treatment than Kat.-alkyl compounds. When a product with Kat.-alkyl compounds is heated in, for instance, air, the product starts to decompose at relatively low temperatures in the neighborhood of 100° C., and decomposition may even be noticeable at temperatures below 100° C. In this situation, mainly alkenes and alkanes are released. No carbon monoxide or carbon dioxide is formed, indicating that no combustion is taking place. Upon a moderate increase in temperature, the rate at which the hydrocarbons are released accelerates such that the amount of hydrocarbons in the gas mixture of the fluidized bed may form an explosive environment. A spark, an electrostatic discharge or even spontaneous ignition can then lead to an explosion.

When the catalyst component has been converted to Kat.-O-alkyl compounds, on the other hand, the product is more stable and decomposes only at higher temperatures. This decomposition generally starts at a temperature of 250° C. or higher and proceeds gradually relative to the non-deactivated catalyst. In addition, it is accompanied by partial combustion that is flameless, this combustion being inferred from the presence of carbon monoxide, carbon dioxide and water in the off-gas, together with a reduced oxygen content. As the temperature increases, the decomposition proceeds further. As the oxygen content of the off-gas is reduced, the explosive range is rapidly narrowed. Combustible components as alkenes and alkanes are set free, but the amounts are reduced so that they remain well outside the explosive range. Therefore, ignition can no longer cause explosive combustion. The partial combustion that does occur is a very gradual and harmless process.

The supported converted catalyst component may then be activated by heating at 400°-1200° C., preferably at 500°-1000° C. The heating time may vary in duration from a few seconds to tens of hours or more. At temperatures in the range of 500°-1100° C., a heating period in the range from 30 minutes to 8 hours, will generally be adequate. The optimum heating period can easily be determined experimentally by one skilled in the art, by preparing catalysts having identical composition and under identical conditions except for the heting period, which is varied. The optimum heating period may then be determined by correlation with desired polymer properties.

As mentioned, heating is necessary to activate the catalyst. However, since the activated catalyst is susceptible to external influences, it may be desirable to store, transport and/or sell catalyst in the non-activated form in which it is obtained after treatment according to the invention. The catalyst can then be activated by heating in the range specified immediately before use.

After cooling to ambient temperature and after air has been expelled by an inert gas, the activated catalyst is introduced into a hydrocarbon solvent which serves as the polymerization medium. The solvent may consist of aliphatic or cyclic hydrocarbons, such as butane, isobutane, normal or branched pentanes, hexanes, heptanes, octanes and higher linear and/or branched saturated aliphatic hydrocarbons, cyclopentane, cyclohexane, cycloheptane, cyclooctane etc. and mixtures, notably fractions directly or indirectly obtained from mineral oil, such as low-boiling gasoline, kerosine or gas oil, which may contain aromatics, but which predominantly consists of aliphatics and/or cycloaliphatics. Additionally aromatic hydrocarbons such as benzene, toluene, xylenes or halogenated hydrocarbons can be used, but, due to practical considerations such as cost and health risks, it is usually preferred to make use of aliphatic hydrocarbons or of mineral oil fractions which contain little or no aromatics.

If desired, other compounds can be added to the activated catalyst dispersed in the organic solvent, such as an organometallic compound of an element of group II or III of the periodic system, e.g. beryllium, magnesium, boron, aluminum or gallium. The atomic ratio of the organometallic compound to the supported chromium components can then vary within wide limits, e.g.

from 0.1:1 to 200:1. Preferably, the ratios lie between 1:1 and 40:1.

To what extent addition of such organometallic compounds is desirable depends on the polymerization conditions and on the polymer desired. At low catalyst concentrations and at relatively low monomer concentrations in the solvent, the polymerization can often be started and sustained if such organometallic compounds are added. The contaminant levels in monomer and solvent also play a role. By experiment it can easily be established whether addition of said organometallic compounds is desirable.

Suspension polymerizations with the catalysts in question are generally performed at temperatures of at most 100° C. In some volatile solvents, such as, for instance, isobutane, the suspension polymerization can be performed at slightly higer temperatures, up to approximately 110° C. By preference, however, polymerization is conducted at temperatures not exceeding 105° C. The polymerization can be performed at temperatures as low as 50° C., but temperatures of at least 70° C., more in particular 85° C. or higher are preferred.

Ethylene polymerizations with the catalysts in question can also be performed at temperatures above 120° C., for example 150°-200° C. A solution of the ethylene polymer in the solvent is then obtained, which can be worked up in a known manner. The polymerization can also be carried out as a so-called gas-phase polymerization, embodiments of which are known from, for instance, British Patent Specification No. 1,373,982.

The polymerization can be carried out at atmospheric pressure, but also at elevated pressure. Where low-boiling solvents are employed, such as, for example, butane, isobutane and pentane, the pressure in the reactor will have to be higher than atmospheric. The monomer pressure may also be atmospheric, but is preferably higher. By performing the polymerization at elevated monomer pressure, higher yields can be obtained, so that elevated pressures up to, for instance, 10 MPa will normally be used. Higher pressures, even up to e.g. 200 MPa or more, are possible but are not usually employed for practical reasons. Preferably, polymerization is carried out at pressures between 600 and 8000 kPA, more in particular between 1200 and 5000 kPA. The pressure selected will in part depend on the polymerization temperature and the volatility of the solvent.

The feasibility of using high monomer pressures will in part be determined by comparing the cost and the safety of an installation permitting the use of relatively high pressures to that for an installation restricting use to relatively low pressures, and balancing that cost against the polyethylene production level at high versus low pressures. The factors determining the eventual choice of the monomer pressure are therefore mainly economic.

The amount of catalyst used is normally such that the content of chromium and any other transition metals in the solvent is in the 0.001–10 mole per liter range, preferably 0.001–0.1 moles per liter.

The present process lends itself to known modifications. For example, the molecular weight may be controlled not only through the temperature but also by addition of hydrogen or other modifying agents conventionally used for the purpose. The polymerization may also be carried out in two or more parallel or series-arranged stages, in which, optionally, different catalyst compositions, temperatures, residence times, pressures, hydrogen concentrations etc. can be applied.

The invention is further explained by the following examples, but is not restricted to them.

EXAMPLE 1

Preparation of a catalyst component consisting of a silica-supported chromium acetyl acetonate/triisobutyl aluminum complex In a thoroughly dried 250 ml flask provided with a stirrer, a dropping funnel and a reflux cooler, 33.6 g (0.096 mol) chromium (III) acetyl acetonate, (Cr(AcAc)$_3$), is suspended in 90 ml dry gasoline, under an atmosphere of dry nitrogen. This suspension is heated, with stirring, to the boiling point, whereupon 72.8 ml of a 3.97 molar solution of triisobutyl aluminum (TIBA) is added dropwise. A strongly exothermic reaction takes place, during which formation of gas is observed, approximately 6.5 liters of a mixture of isobutane and isobutylene being formed. The reaction is continued for 1 hour at reflux temperature. The complex solution obtained is dark brown in color and contains only traces of precipitate. Before being processed further, the solution is first separated from any solids by filtration.

1 kg of silica support is pre-dried for 4 hours at 200° C., dry air being passed through while heating. After the air over the support has been purged by nitrogen, the silica support is suspended in approximately 5 liters of gasoline in a 10 liter flask. To this suspension the filtered solution of the Cr(AcAc)$_3$/TIBA-complex is added dropwise, at room temperature and with vigorous stirring. Stirring is continued for 1 hour after addition is complete. The gasoline has now completely lost its color and the complex has deposited on the silica support.

EXAMPLE 2

Conversion of the catalyst component with oxygen followed by activation by heating in a non-reducing atmosphere By filtering the suspension obtained according to Example 1, the gasoline is for the greater part removed. Any residue of gasoline is removed at elevated temperature by blowing dry nitrogen into the bottom of the reaction vessel. After cooling to ambient temperature, the catalyst component obtained is subsequently cautiously treated with dry air, the rate of addition of O$_2$ being controlled in such a way that the temperature never exceeds 100° C.

500 g of the catalyst component thus prepared is introduced into a fluidized bed reactor with a volume of 8 liters and L/D ratio of 10. Air is introduced into the reactor at such a rate that the linear velocity is $1.8 \times 10^{-2}$/sec. The reactor is heated up at the rate of 135° C./hour, to a final temperature of 900° C. This final temperature of 900° C. is maintained for 8 hours. The gas issuing from the fluidized bed is analyzed at regular intervals. Decomposition of the catalyst is found to start at approximately 250° C., giving rise to the release mainly of butylenes, and in addition minor amounts of propylene, ethylene and methane. Also small amounts of carbon monoxide and carbon dioxide are detected. The oxygen content is slightly lower than that of the air led into the fluidized bed. At 375° C. virtually no butylenes, but almost exclusively minor amounts of methane are found. The amounts of carbon monoxide and carbon dioxide are considerably larger and the oxygen content is no more than 13.8% by volume.

EXAMPLE 3

Conversion of the catalyst component with methanol followed by activation in a non-reducing atmosphere To the suspension obtained according to Example 1, 17 g methanol is added at room temperature. After half an hour of stirring, the suspension is recovered by filtration. The catalyst is subsequently dried by passing dry nitrogen through it.

500 g of the catalyst component thus prepared is heated 8 hours at 900° C. in a fluidized bed phase in air, in accordance with Example 2. The off-gas is analyzed at regular intervals. The decomposition starts at about 250° C., with mainly methane evolving, and in addition small amounts of carbon monoxide and carbon dioxide. As the temperature rises, the amounts of carbon monoxide and carbon dioxide are seen to increase, and the amount of methane is even found to decrease, after an initial increase.

EXAMPLE 4

Polymerization of ethylene using the catalyst of Example 2

Into a stirred reactor (5 liters), 1.2 kg of dry isobutane is introduced. After the contents of the reactor have been raised to a temperature of 91° C., ethylene is forced in until the reactor pressure is 24 bar. Finally, 280 mg of the catalyst component obtained according to Example 2 is added. Polymerization is performed for 135 minutes, during which the total pressure in the reactor is kept constant by forcing ethylene into the reactor. The contents of the reactor are kept at 91° C. throughout the polymerization.

The polyethylene yield is 3600 grams per gram of catalyst.

EXAMPLE 5

Polymerization of ethylene using the catalyst of Example 3

Into a stirred reactor (5 liters), 1.2 kg dry isobutane is introduced. After the contents of the reactor have been raised to a temperature of 98° C., hydrogen at 2.5 bar is forced into the reactor, and next ethylene, until the total pressure is 28 bar. Finally, 455 mg of the catalyst prepared according to Example 3 is added. Polymerization is performed for 50 minutes, during which the total pressure in the reactor is maintained by forcing in ethylene. Throughout the polymerization, the temperature of the contents of the reaction vessel is maintained at 98° C.

The polyethylene yield is 2460 grams per gram of catalyst.

EXAMPLE 6

A complex of 33.6 g (0.096 mol) chromium (III) acetyl acetonate and 288 mmol dibutyl magnesium is prepared according to the process of Example 1. The dibutyl magnesium has been dissolved in low-boiling gasoline with 10 mol % of triethyl aluminum, to form a 0.35 molar solution. The chromium(III) acetyl acetonate/tri(dibutyl) magnesium complex is deposited onto a silica support according to the process of Example 1, the alkyl groups are converted with methanol, and the catalyst is activated according to the process of Example 3.

Into a stirred reactor (5 liters), 1.2 kg dry isobutane is now introduced. After the contents of the reactor have been raised to a temperature of 98° C., hydrogen at 2.5 bar is forced in, and ethylene is forced in to a total pressure of 27 bar. Next triethyl boron (TEB) is added until the boron conteraction vessel is maintained at 98° C.

The polyethylene yield is 2460 grams per gram of catalyst.

What is claimed is:

1. A process for preparing a chromium-containing catalyst component which, upon activation with heat at a temperature of from 200° to 1200° C. will effect the polymerization of alpha-olefins, which process comprises:
    a. applying to an inert inorganic support the reaction product of
        (1) a chromium compound, with
        (2) one or more group II or III metal hydrocarbyl compounds, wherein the hydrocarbyl groups contain 1–20 carbon atoms; and
    b. thereafter treating the product of step (a) with an atmosphere containing molecular oxygen at a temperature less than 100° C., or an organic compound containing one or more hydroxygroups reactive with the hydrocarbyl groups of said product to decompose the reactive hydrocarbylgroups thereon.

2. Process of claim 1 wherein the oxygen is derived from a stream of air.

3. Process of claim 1 wherein said organic compound containing an oxygen atom is an alcohol.

4. Process of claim 3 wherein the alcohol contains 1–3 carbon atoms.

5. Process of claim 4 wherein the alcohol is methanol.

6. Process for preparing a supported chromium-containing catalyst for the polymerization of alpha-olefins wherein the catalyst component of claim 1 is heated at a temperature from 200°–1200° C. in a non-reducing atmosphere.

7. The catalyst component formed by the process of claim 1.